United States Patent
Brown et al.

(10) Patent No.: US 10,686,385 B2
(45) Date of Patent: Jun. 16, 2020

(54) APPARATUS TO REALIZE FAST BATTERY CHARGING AND MOTOR DRIVING FOR ELECTRIC VEHICLES USING ONE AC/DC CONVERTER

(71) Applicant: HELLA GmbH & Co. KGaA, Lippstadt (DE)

(72) Inventors: Alan Wayne Brown, Canton, MI (US); Hua Bai, Flint, MI (US)

(73) Assignee: HELLA GmbH & Co. KGaA, Lippstadt (DE)

( * ) Notice: Subject to any disclaimer, the term of this patent is extended or adjusted under 35 U.S.C. 154(b) by 232 days.

(21) Appl. No.: 15/915,400

(22) Filed: Mar. 8, 2018

(65) Prior Publication Data

US 2018/0278168 A1  Sep. 27, 2018

Related U.S. Application Data

(60) Provisional application No. 62/475,566, filed on Mar. 23, 2017.

(51) Int. Cl.
*H02M 3/335* (2006.01)
*B60L 15/00* (2006.01)
(Continued)

(52) U.S. Cl.
CPC ....... *H02M 3/33584* (2013.01); *B60L 15/007* (2013.01); *B60L 53/22* (2019.02);
(Continued)

(58) Field of Classification Search
None
See application file for complete search history.

(56) References Cited

U.S. PATENT DOCUMENTS

| 8,125,105 B2 * | 2/2012 | Ishida | H02J 1/102 |
| | | | 307/86 |
| 8,411,473 B2 * | 4/2013 | Cheng | H02M 3/337 |
| | | | 363/17 |

(Continued)

FOREIGN PATENT DOCUMENTS

WO  2014050354 A1  4/2014

OTHER PUBLICATIONS

Arjun raj prabu, Bidirectional SiC Three-Phase AC-DC Converter with DQ current control, IEEE, 3474-3481 (Year: 2015).*

(Continued)

*Primary Examiner* — Bickey Dhakal
(74) *Attorney, Agent, or Firm* — Warner Norcross + Judd LLP

(57) ABSTRACT

An apparatus includes a controller, a switching block, and a three-phase bidirectional AC/DC converter. The switching block has a first interface connected to a power grid, a second interface connected to an electric motor, and a third interface connected to the three-phase bidirectional AC/DC converter that includes first, second, and third single-phase AC/DC conversion modules, and which have inputs and outputs joined at an output node, and a respective transformer configured to provide electrical isolation. In a first mode of operation, the switching block connects the power grid to the AC/DC converter for charging a battery connected to the output node and disconnects the electric motor. In a second mode of operation, the switching block disconnects the power grid and connects the electric motor to the AC/DC converter which is controlled to convert DC power drawn from the battery to energize the electric motor.

15 Claims, 7 Drawing Sheets

(51) Int. Cl.
    *B60L 53/22* (2019.01)
    *B60L 53/24* (2019.01)
    *H02P 27/06* (2006.01)
    *H02M 1/00* (2006.01)
    *H02J 7/14* (2006.01)
    *H02J 7/00* (2006.01)
    *H02J 7/02* (2016.01)
    *H02M 1/08* (2006.01)
    *H02M 1/42* (2007.01)
    *B60L 50/51* (2019.01)

(52) U.S. Cl.
    CPC ............... *B60L 53/24* (2019.02); *H02J 7/00* (2013.01); *H02J 7/0068* (2013.01); *H02J 7/022* (2013.01); *H02J 7/14* (2013.01); *H02M 1/083* (2013.01); *H02M 1/4216* (2013.01); *H02P 27/06* (2013.01); *B60L 50/51* (2019.02); *B60L 2210/10* (2013.01); *B60L 2210/30* (2013.01); *H02J 2207/20* (2020.01); *H02M 2001/0058* (2013.01); *H02P 2201/07* (2013.01)

(56) References Cited

U.S. PATENT DOCUMENTS

| | | | | |
|---|---|---|---|---|
| 8,847,544 | B2* | 9/2014 | Ang | H02J 7/047 |
| | | | | 320/104 |
| 9,837,996 | B2* | 12/2017 | Kuznetsov | H03K 3/45 |
| 9,923,448 | B2* | 3/2018 | Nikitin | H02M 1/12 |
| 2011/0248563 | A1 | 10/2011 | Komma et al. | |
| 2013/0342135 | A1 | 12/2013 | De Sousa et al. | |
| 2014/0055080 | A1* | 2/2014 | Ishikura | B60M 3/00 |
| | | | | 320/103 |
| 2016/0276964 | A1* | 9/2016 | Zushi | B60L 15/007 |
| 2017/0282723 | A1* | 10/2017 | Tian | B60L 11/10 |

OTHER PUBLICATIONS

International Search Report and Written Opinion dated Jul. 4, 2018 in corresponding International Application No. PCT/IB2018/051982.

* cited by examiner

APPARATUS TO REALIZE FAST BATTERY CHARGING AND MOTOR DRIVING FOR ELECTRIC VEHICLES USING ONE AC/DC CONVERTER

CROSS-REFERENCE TO RELATED APPLICATIONS

This application claims the benefit of U.S. provisional application No. 62/475,566, filed 23 Mar. 2017 (the '566 application), which '566 application is hereby incorporated by reference as though fully set forth herein.

BACKGROUND a. Technical Field

The instant disclosure relates generally to power electronics systems, and more particularly to a system and method to realize fast battery charging and motor driving for example for electric vehicles using one AC/DC converter.

b. Background

This background description is set forth below for the purpose of providing context only. Therefore, any aspects of this background description, to the extent that it does not otherwise qualify as prior art, is neither expressly nor impliedly admitted as prior art against the instant disclosure.

Isolated alternating current (AC)/direct current (DC) electric power converters can be used in many different applications. For example only, such an electric power converter can draw power from the grid or mains (i.e., AC power) and be used as a battery charger to charge a DC rechargeable battery associated with an electric-motor powered automotive vehicle. In an electric-motor powered vehicle, the power electronics converters are the most economically expensive parts in addition to the battery pack (e.g., a DC rechargeable battery). As two major power electronics converters, battery chargers (i.e., an AC/DC converter) and the electric motor drive systems (i.e., a DC/AC inverter) are usually separate units even though they share the same battery pack. For the charger design, the electrical isolation between the grid and the battery requires the existence of a transformer and inductors, which results in a situation where the battery charger is the most bulky (i.e., volume occupying) power electronics component in or on the electric-motor powered vehicle. For the DC/AC inverter, the DC-bus capacitor that is paralleled with the battery is also typically bulky and heavy as well, occupying perhaps ~⅓ of the overall inverter space.

It would be desirable to provide a system and method to perform the above-mentioned at least two functions of battery pack charging as well as motor driving that minimizes and/or eliminates at least one or more of the above-mentioned disadvantages and/or problems.

The foregoing discussion is intended only to illustrate the present field and should not be taken as a disavowal of claim scope.

SUMMARY

In an embodiment, an electric power conversion apparatus is provided that includes an electronic controller including a processor and a memory, a switching block, and a three-phase bidirectional AC/DC converter. The switching block is controlled by the controller and has a first interface configured to be connected to a power grid source for receiving a first AC signal having first, second, and third phases (electrical phases). The switching block has a second interface configured to be connected to an electric motor. The three-phase bidirectional AC/DC converter is configured to be connected to a third interface of the switching block and includes first, second, and third single-phase AC/DC conversion modules. Each AC/DC conversion module is connected to and controlled by the controller. In an embodiment, each single-phase AC/DC conversion module has a respective input that is configured to be connected to a respective phase of the first AC signal having first, second, and third phases. The AC/DC conversion modules also have respective outputs joined at an output node as well as having a respective transformer configured to provide electrical isolation.

In a first mode of operation, the controller controls the switching block to assume a first condition that (i) connects the first and third interfaces so that the power grid is connected to the three-phase bidirectional AC/DC converter, which is operative to convert the first three-phase AC signal into an output signal having a DC component at the output node for charging a battery. In the first mode, the switching block disconnects the second and third interfaces to thereby disconnect the electric motor.

In a second mode of operation, the controller controls the switching block to assume a second condition that (i) disconnects the first and third interfaces so as to disconnect the power grid, and (ii) connects the second and third interfaces to thereby connect the electric motor to the three-phase bidirectional AC/DC converter which is operative to convert DC power drawn from the battery to a second AC signal for energizing the electric motor. In an embodiment, the apparatus can be used as both a battery charger to charge the DC rechargeable battery (e.g., associated with an electric-motor powered automotive vehicle) as well as being capable of being used as an inverter to drive the electric motor of the automotive vehicle.

Through the foregoing, embodiments consistent with the present disclosure provides an improved electric power conversion apparatus that realizes both fast battery charging and electric motor driving using a single bidirectional AC/DC converter, which reduces cost, reduces bulkiness which increases power density, increases efficiency, and promotes fast charging.

The foregoing and other aspects, features, details, utilities, and advantages of the present disclosure will be apparent from reading the following description and claims, and from reviewing the accompanying drawings.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Figure 1:
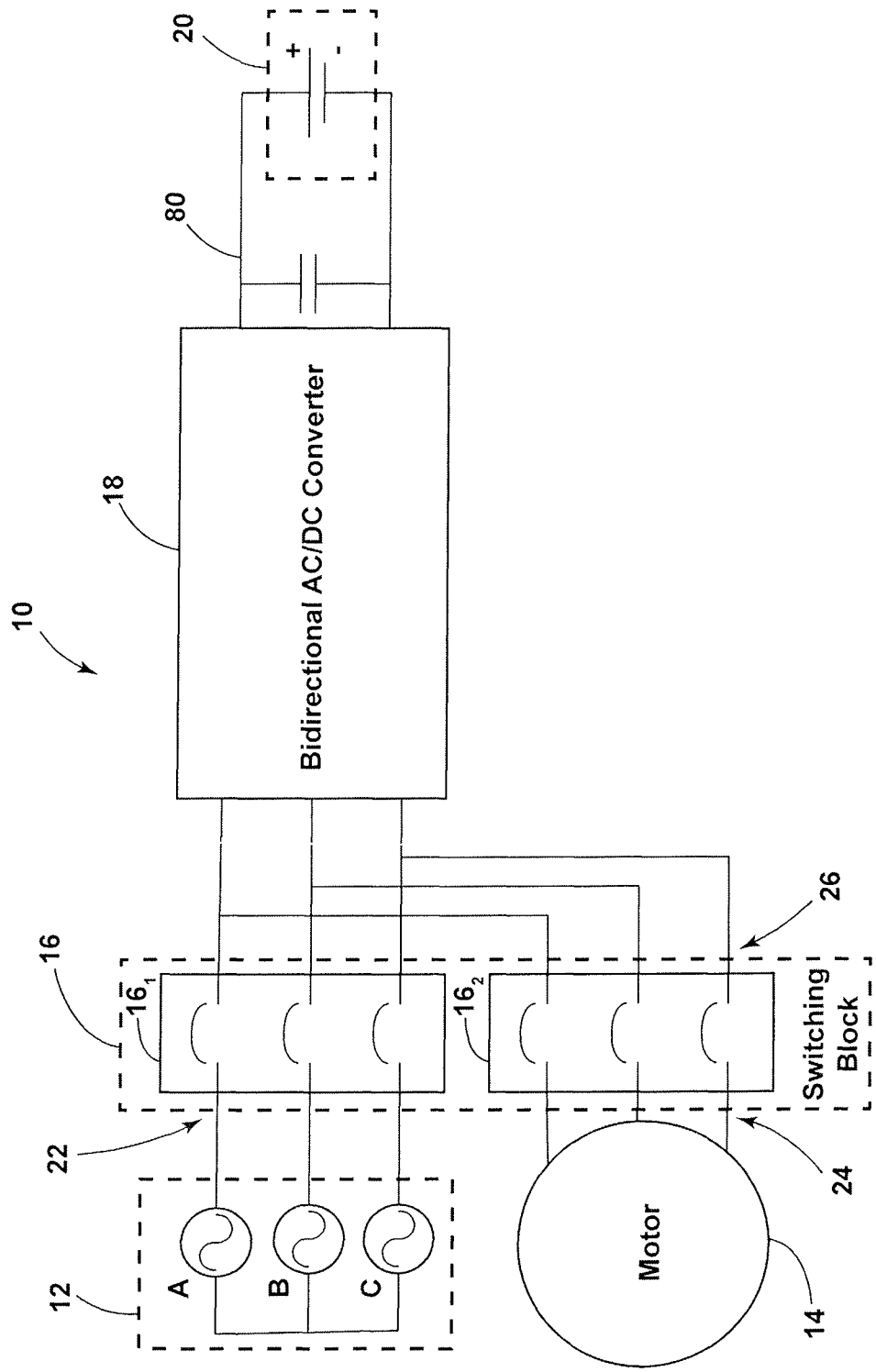
FIG. 1 is a schematic and block diagram of an electric power conversion apparatus using a single bidirectional AC/DC converter in accordance with an embodiment.

Referring now to the drawings wherein like reference numerals are used to identify identical or similar components in the various views, FIG. 1 is a simplified schematic and block diagram of an embodiment of an electric power conversion apparatus 10 according the present disclosure, which uses one bidirectional AC/DC converter 18 to realize both battery charging (e.g., high power fast battery charging) and electric motor driving functions. FIG. 1 represents an equivalent circuit of an embodiment, and shows an alternating current (AC) input power source 12, an electric motor 14, a switching block 16, a bidirectional AC/DC converter 18, and a re-chargeable DC electric battery 20.

The AC source 12 may be a main AC power supply or electrical system for a building or the like provided within an overall larger AC electric power grid (hereinafter sometimes referred to as grid power, grid voltage, grid-side, etc.). As shown, the AC source 12 may be a multi-phase (e.g., 3-phase: phase A, phase B, phase C). Depending on location, the AC source 12 may output 208/480 V AC 3-phase at 60 Hz or 380-480 V AC 3-phase at 50 Hz. The voltage $V_b$ of the battery 20 may be nominally between about 200-500 VDC (e.g., 400 V DC). It should be understood, however, that lower or higher DC battery voltage levels now known or hereafter developed may be employed according to the instant teachings.

The electric motor 14 may be any conventional electric motor, for example only, an electric motor suitable for use in an electric-motor powered electric automotive vehicle. In an embodiment, motor 14 may comprise a permanent magnet synchronous motor (PMSM) as described below in greater detail in connection with FIG. 10, as controlled by an electronic controller (e.g., the controller 46—FIG. 5).

Switching block 16 is also controlled by a controller (e.g., the controller 46—FIG. 5) and may be functionally represented as a first electrical relay bank $16_1$ and a second electrical relay bank $16_2$. The switching block 16 includes a first interface 22 configured to be electrically connected to the AC power source 12 for receiving a first (grid) AC power signal having first, second, and third electrical phases (e.g., each phase being offset by 120 degrees). The first interface 22 as shown may include three separate electrical connections corresponding to the three phases of the AC input signal from the grid source 12. The switching block 16 further includes a second interface 24 configured to be electrically connected to the electric motor 14. The second interface 24 also includes three electrical connections corresponding to the three phases of the AC drive signal that drives (energizes) the electric motor 14. The switching block 16 further includes a third interface 26 configured to be electrically connected to the bidirectional AC/DC converter 18. As shown, the third interface 26 includes the six electrical connections from relay banks $16_1$ and $16_2$ although in the illustrated embodiment, respective connections from each of the relay banks $16_1$ and $16_2$ are electrically connected (joined) resulting in three connections to the bidirectional AC/DC converter 18.

In an embodiment, the respective relay banks $16_1$ and $16_2$ operate as two three-phase switches, the bank $16_1$ being used for the AC grid connection and the bank $16_2$ being used for the electric motor connection. The banks $16_1$ and $16_2$, additionally, are controlled to operate in a complementary fashion. Thus, when charging a vehicle, the connections of the bank $16_1$ are closed while the connections of the bank $16_2$ are open. Likewise, when driving the motor, the connections of the bank $16_1$ are open and the connections of the bank $16_2$ are closed. The switching block 16 may comprise electrical switches, relays, solid state switches, and other conventional devices configured to open and close electrical connections. In an embodiment, a hardware implementation may be chosen to enforce the complementary operation, such as by the use of double-pole double-throw (DPDT) switches or equivalents thereof (i.e., only one of the AC grid connection and the electric motor connection can be closed at any time but not both).

The bidirectional AC/DC converter 18 is configured generally to operate in two modes. In a first mode, the converter 18 is operative to convert the input three-phase AC signal from AC grid source 12 to an output signal having a mainly DC component on an output node 80, for the purpose of charging or recharging the battery 20. In a second mode of operation, the converter 18 is operative to convert DC power drawn from the battery 20 into an output three-phase electrical signal for driving (energizing) the electrical motor 14. As will be described in greater detail below, the converter 18 includes a plurality of transformers (e.g., one for each phase) configured to provide electrical isolation between the grid and the battery as well as between the battery and the electric motor.

Figure 2:
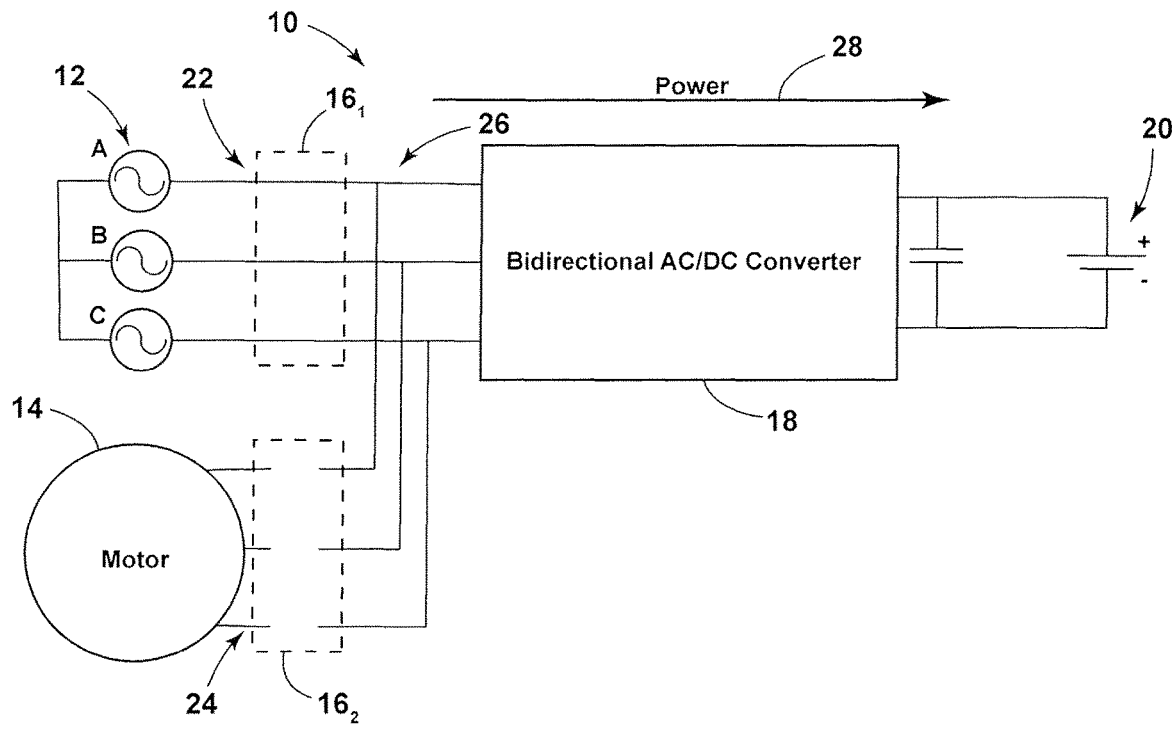
FIG. 2 shows a first power flow in a first mode of operation of the apparatus of FIG. 1 for charging a rechargeable battery from grid power.
Figure 3:
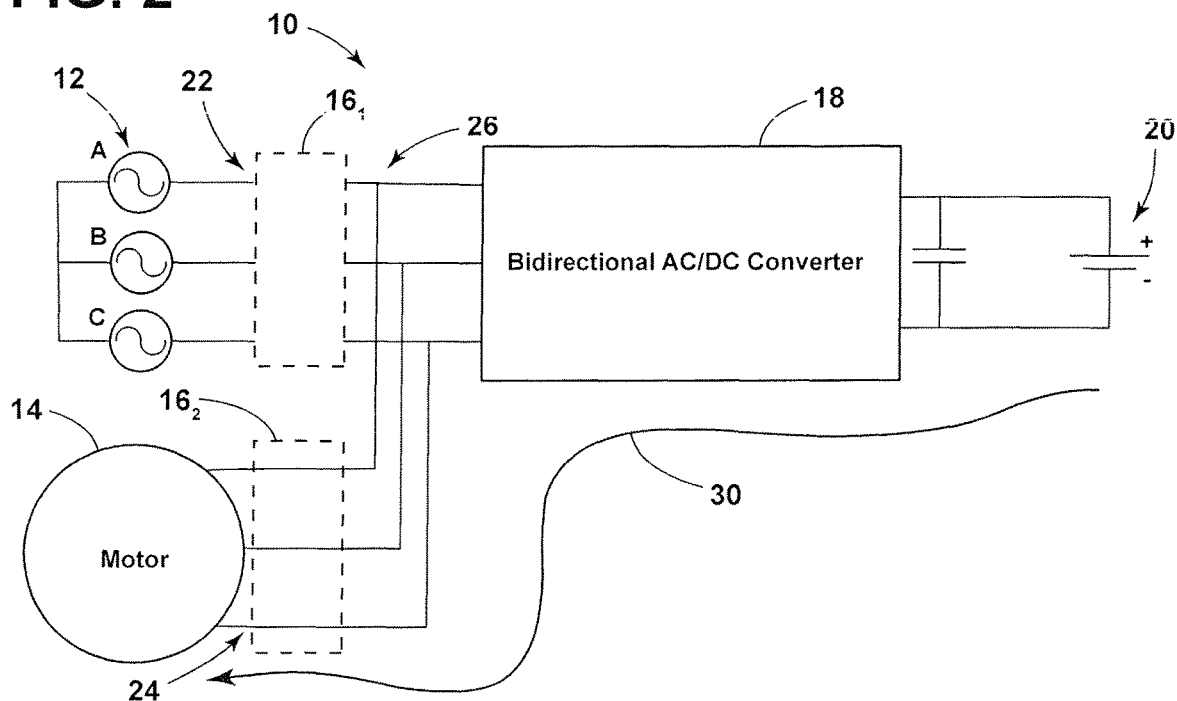
FIG. 3 shows a second power flow in a second mode of operation of the apparatus of FIG. 1 for driving an electric motor (AC power) from DC power drawn from the battery.

FIGS. 2-3 respectively show apparatus 10 in the first charging mode of operation and the second motor driving mode of operation.

In the first mode of operation (FIG. 2), the controller (e.g., controller 46—FIG. 5) controls the switching block 16 to assume a first condition, where the switching block 16 electrically connects the first interface 22 and the third interfaces 26 so that the first three-phase AC grid power signal from source (grid) 12 is electrically connected to the bidirectional AC/DC converter 18. The converter 18 is, in turn, operative through the control of the controller to convert the three-phase AC input signal to an output signal (principally DC component) for charging the battery 20. Simultaneously, in the first mode, the switching block 16 in the first condition electrically disconnects the second interface 24 from the third interface 26 to thereby electrically disconnect the electric motor 14. As shown in FIG. 2, electric power flows from the AC grid power source 12 to the battery 20 as indicated by reference numeral 28. In representative fashion, the connections of the bank $16_1$ are electrically closed while the connections of the bank $16_2$ are electrically open.

In the second mode of operation (FIG. 3), the controller (e.g., controller 46—FIG. 5) controls the switching block 16 to assume a second condition, where the switching block 16 electrically disconnects the first interface 22 and the third interfaces 26 so as to electrically disconnect the AC grid power source 12. Simultaneously in the second mode, the switching block 16 in the second condition electrically connects the second interface 24 to the third interface 26 to thereby electrically connect the electric motor 14 to the bidirectional AC/DC converter 18. The converter 18, in turn, is controlled by the controller to convert DC power drawn from the battery 20 to a second three-phase AC signal suitable for driving or electrically energizing the electric motor 14. As shown in FIG. 3, power flows from the battery 20 to the electric motor 14, as indicated by reference numeral 30. In representative fashion, the connections of the bank $16_1$ are electrically open while the connections of the bank $16_2$ are electrically closed.

Embodiments consistent with the present disclosure have a number of advantages, including the following.

Low Cost.

Using one AC/DC converter to realize both fast charging and motor driving results in a significant cost reduction of the overall power electronics systems on board an electric vehicle, as compared to conventional realizations that include separate AC/DC and DC/AC converters for the charging and driving functions.

High Power Density.

In an embodiment, the bidirectional AC/DC converter employs GaN HEMTs solid state switches in the switching modules (more below), which may be operated at a relatively high switching frequency of >100 kHz, which may be nearly ten times as fast as a switching frequency associated with conventional Si switches. Such a high switching frequency results in higher-order harmonics that are easier to be filtered. As a result, this situation allows the use of much smaller output capacitors paralleled to the battery.

High Efficiency.

A conventional DC/AC inverter works at the hard switching mode, which results in high switching losses thereby low switching frequency. In an embodiment, the bidirectional AC/DC converter is configured to work in a soft switching mode resulting in higher efficiency. In contrast, a conventional Si switch-based inverter may have a 10 kHz switching frequency and 96% efficiency, while a GaN HEMT switch based inverter embodiment has a >100 kHz switching frequency and 98% efficiency, even with an isolation transformer.

Promoting Fast Charging.

In a conventional battery charger, its power capability is limited not only by the grid power, but is also limited by its cost as well as the amount of space available. With many of the single-phase chargers having a power density of about 1 kW/L and three-phase chargers having a power density of about 2 kW/L, it is difficult to design a charger with a power capability of >20 kW, which would require significant space (volume) in the vehicle in order to implement it. However, by using the same converter for both the battery charging and the motor driving purposes, the charger and the inverter will have the same power level, which makes the system particularly suitable for use in the so-called fast (high power) battery charging approach, for example, with a power capability in the range of 50 kW.

Figure 4:
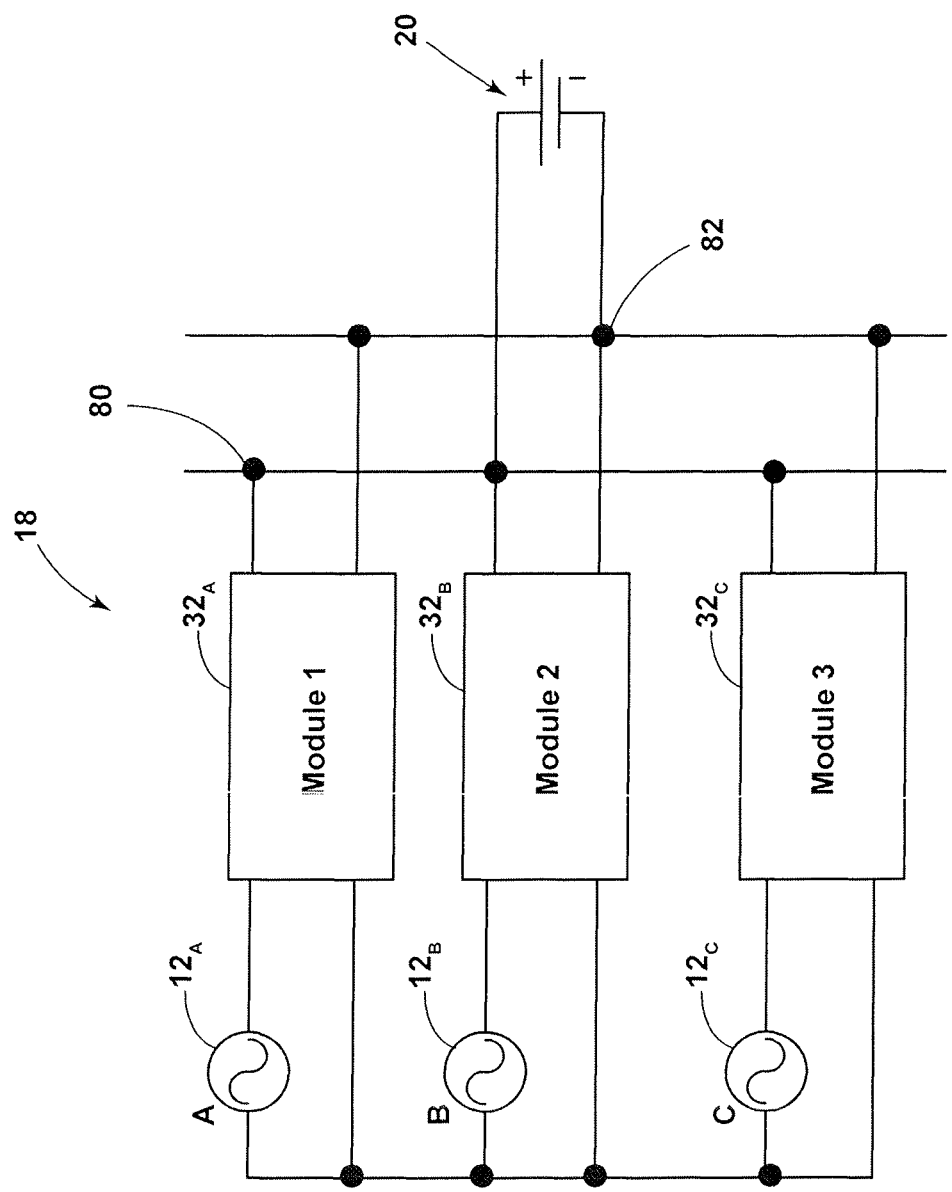
FIG. 4 is a simplified schematic and block diagram showing, in greater detail, the bidirectional AC/DC converter of FIGS. 1-3 and having a respective AC/DC conversion module for each of the first, second, and third phases of an AC grid power signal.

FIG. 4 is a simplified schematic and block diagram showing a topology of an embodiment of the bidirectional AC/DC converter 18 of FIG. 1. In an embodiment, the converter 18 includes first, second, and third single-phase AC/DC conversion modules designated by reference numerals 32A, 32B, and 32C in FIG. 4. Each of the conversion modules 32A, 32B, and 32C have a respective input that is electrically connected to one of the phases phase A, phase B, and phase C of the AC grid power signal from grid source 12. As further shown, the conversion modules 32A, 32B, and 32C have outputs that are electrically joined between the output node 80 and a common ground node 82. Each of the conversion modules 32A, 32B, and 32C are also connected a controller (e.g., the controller 46—FIG. 5) which controls the operation of the modules.

Each conversion module 32A, 32B, and 32C also includes a respective transformer that provides electrical isolation between the grid and the battery 20 when charging the battery 20. Additionally, however, when driving the electric motor 14, the converter 18 operating as an inverter—also inherits the transformer and the electrical isolation that it provides between the battery 20 and the motor 14. However, since the transformer is operated at a much higher switching frequency (below), its size will be much smaller than conventional. Therefore the transformer will not be the drawback when operated in the second, electric driving mode of operation.

Figure 5:
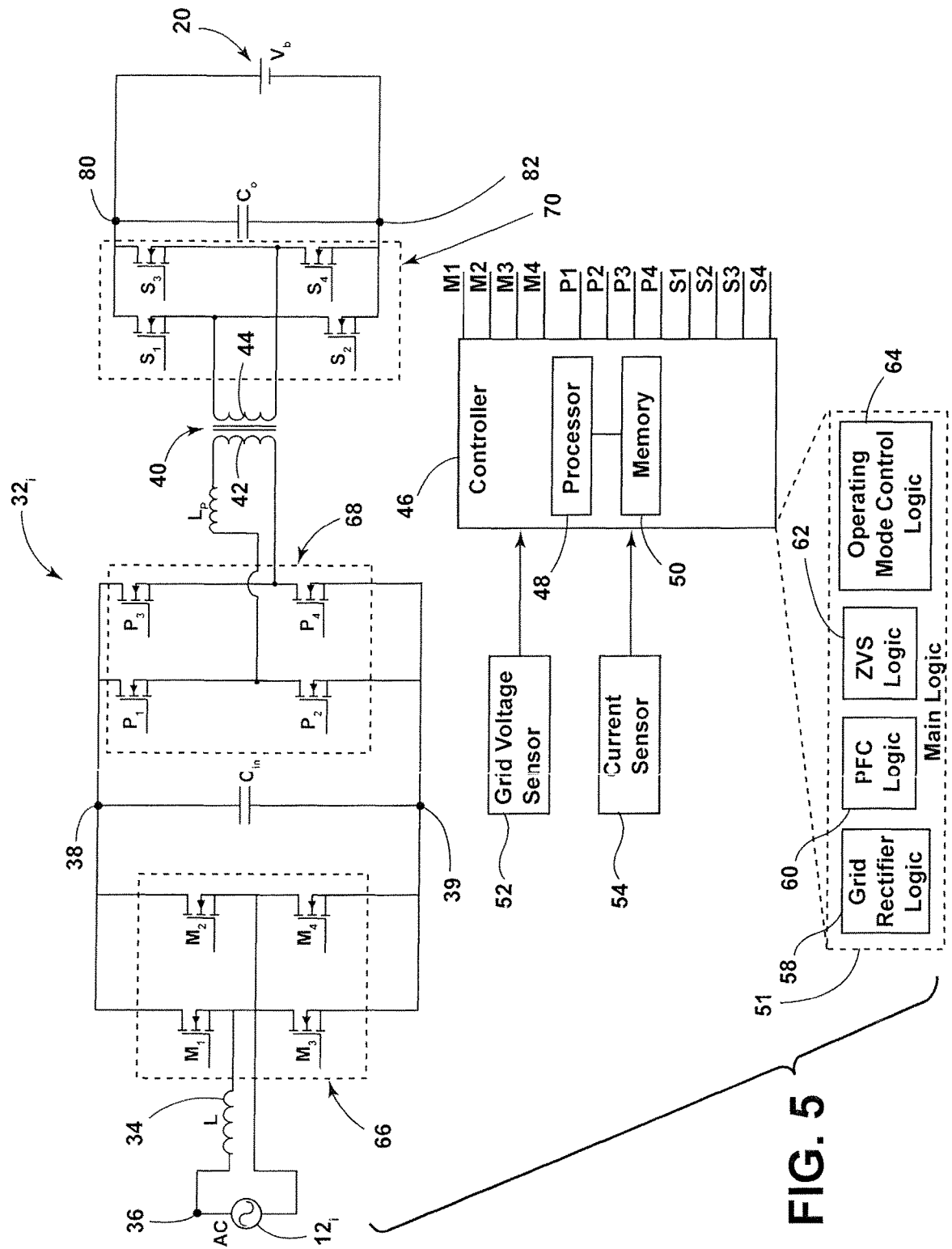
FIG. 5 is diagrammatic schematic and block diagram showing in greater detail, in an embodiment, one of the AC/DC power conversion modules that are shown in FIG. 4 in block form.

FIG. 5 is a simplified schematic and block diagram showing, in greater detail, one of the AC/DC conversion modules of FIG. 4 along with a controller 46 to control its operation. As shown, one AC/DC conversion module, designated 32$_i$ where i can be one of the phases A, B, or C, is coupled to a corresponding one of the phases of the AC grid power source 12. With this context, a single-phase AC signal is provided on an input node 36 as shown. The conversion module 32$_i$ may include an input inductor 34, electrically coupled in series with the AC source, configured to smooth the grid-side current. The size of the inductor 34 will depend on the degree of smoothing and the switching frequency. In an embodiment, the inductor 34 may be about 10 microhenry (μH). The conversion module $32_i$ is also configured to output a DC voltage signal on the output node 80.

Each single-phase conversion module $32_i$ includes of a respective rectifier stage 66 and a respective dual-active-bridge (DAB) stage. The DAB stage includes (i) a first full bridge 68, (ii) a transformer 40, and (iii) a second full bridge 70.

The rectifier stage 66 (AC/DC converter) constitutes a means for rectifying the first AC input signal at node 36 and producing a first rectified output signal at node 38 relative to ground node 39. The first rectified signal includes a first direct current (DC) component. The rectifier stage 66 may include four semiconductor switches, designated $M_1$, $M_2$, $M_3$, $M_4$, arranged in a full bridge configuration and operating at the grid frequency (e.g., 50/60 Hz) when operating in the first (charging) mode of operation. When operating in the second (motor driving) mode of operation, the rectifier stage 66 may operates at an electric motor frequency (e.g., fundamental frequency).

The switches $M_1$, $M_2$, $M_3$, $M_4$ may comprise conventional semiconductor switches known in the art, such as MOSFET or IGBT devices. In an embodiment, the switches $M_1$, $M_2$, $M_3$, $M_4$ may comprise Si N-Channel power MOSFETs provided under the trade designation and/or part number STY139N65M5 from STMicroelectronics, Coppell, Tex., USA.

The conversion module $32_i$ may also include a capacitor $C_{in}$ that is connected across the output of the rectifier stage 66 between the node 38 and ground node 39. Capacitor $C_{in}$ is configured in size to filter high-frequency harmonics from the rectified signal at node 38 (e.g., it is relatively small: ~uF level). It should be understood that $C_{in}$ is not used for energy storage, but is rather used for filtering purposes, and is thus not a large, bulky DC-bus capacitor where the DC-bus capacitor may be on the order of millifarads (~mF). This reduced size in $C_{in}$ can also increase the power density and extend the service life.

The first full bridge 68 (i.e., a DC/AC converter 68) is electrically connected to the output of the rectifier stage 66 (i.e., connected across nodes 38, 39) and is configured to convert the first DC (rectified) signal on node 38 into a relatively high frequency AC signal. As illustrated, the bridge 68 may comprise four semiconductor switches, designated $P_1$, $P_2$, $P_3$, $P_4$, and is arranged in a full bridge configuration operating at a second frequency, namely, a switching frequency $f_s$. The second, switching frequency $f_s$ is generally much higher than the first, grid frequency. In an embodiment, the second, switching frequency may be in a range of between about 135 kHz to 500 kHz, while the first, grid frequency may be 60 Hz (or 50 Hz). The semiconductor switches $P_1$, $P_2$, $P_3$, $P_4$ may comprise commercially available components known in the art. In an embodiment, the switches $P_1$, $P_2$, $P_3$, $P_4$ may comprise commercially available wide handgap components, for example, such as 650V GaN High Electron Mobility Transistor (HEMT) device, such as an enhancement mode GaN transistor provided under the trade designation and/or part number GS66516T from GaN Systems Corp., Ann Arbor, Mich., USA.

The first and second full bridges 68, 70 of the dual-active-bridge (DAB) are electrically isolated but are coupled (magnetically) by way of transformer 40 which has a primary winding 42 and a secondary winding 44. The first full bridge 68 is electrically connected to the primary winding 42 through a series inductor $L_p$. It may be appreciated that series inductor $L_p$ may be either a built-in leakage inductance in the transformer or an external inductance placed in series with the transformer. Inductance $L_p$ may be used to store energy to attain Zero Voltage Switching (ZVS) on the primary and secondary full bridge semiconductors during high frequency switching process. Additionally, as known, transformer 40 is characterized by a turn ratio between the secondary winding and the primary winding.

Figure 9:
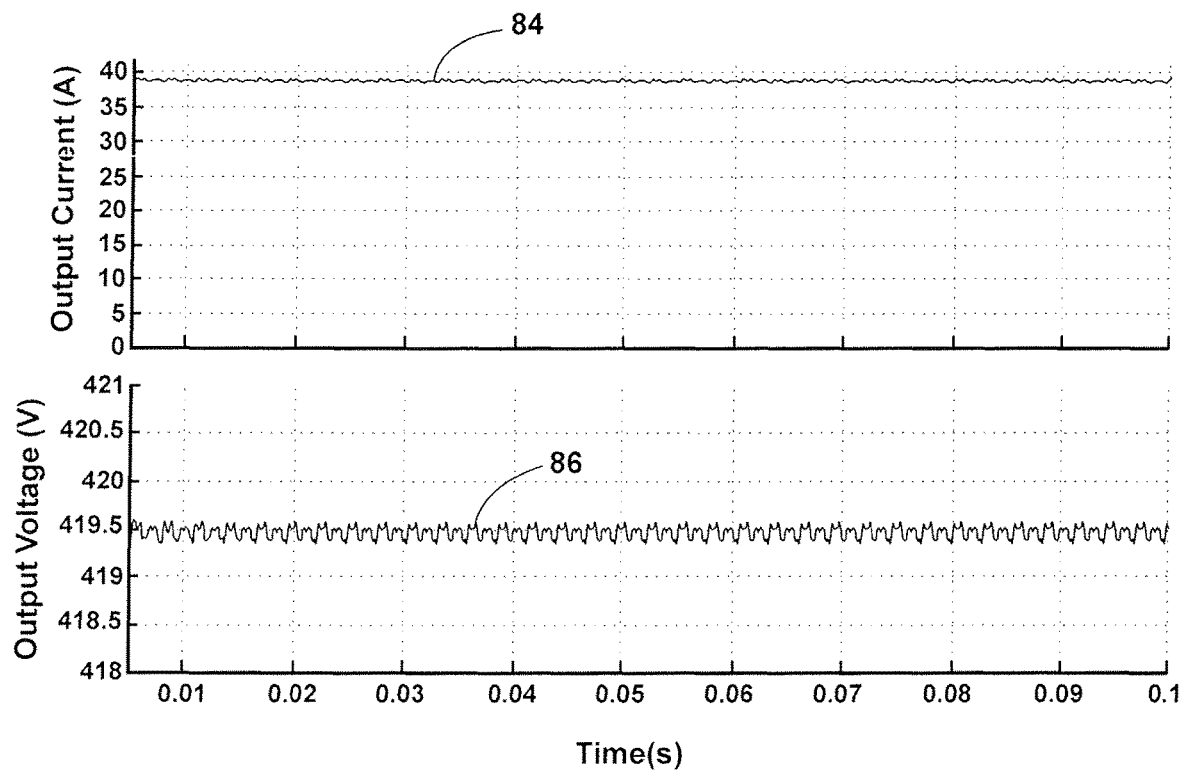
FIG. 9 shows load side (battery) current and voltage output from the embodiment of FIG. 5 in the first (charging) mode of operation.

The second full bridge 70 (i.e., an AC/DC converter 70) is electrically connected to the second winding 44 of transformer 40 and is configured to convert or rectify the AC signal induced on the secondary winding 44 to a second rectified output signal on output node 80. The output signal produced on the output node 80 from the single-phase conversion device $32_i$ has a DC component and at least one AC component, wherein the at least one AC component includes a second order harmonic of the grid frequency (e.g., a 120 Hz components for a 60 Hz grid frequency). While each single-phase module $32_i$, will generate a respective 120 Hz ripple signal, the combination of these individual ripple signals, by virtue of a phase difference therebetween, will tend to cancel each other out and thereby get neutralized when used in the three-phase mode (charging mode). This is shown in FIG. 9, with reduced ripple output current shown in trace 84 and reduced ripple output voltage shown in trace 86 (with reference to the output voltage to the battery being nominally 400 volts).

In the illustrated embodiment, the second full bridge 70 (AC/DC converter 70) may comprise four semiconductor switches, designated switches $S_1$, $S_2$, $S_3$, $S_4$, arranged in an active H-bridge (full) switching arrangement. In an embodiment, switching arrangement 70 is controlled to operate at the above-mentioned switching frequency $f_s$ (i.e., switches $S_1$~$S_8$ are controlled to operate at the same switching frequency $f_s$). The semiconductor switches $S_1$, $S_2$, $S_3$, $S_4$, may comprise commercially available components, for example, a 650V GaN High Electron Mobility Transistor (HEMT) device, such as an enhancement mode GaN transistor provided under the trade designation and/or part number GS66516T from GaN Systems Corp., Ann Arbor, Mich., USA.

FIG. 5 also shows an output capacitor designated $C_o$ connected across the output node 80 and ground node 82 and is configured in size to filter high-frequency harmonics from the output signal at node 80 (e.g., relatively small: ~uF level). In an embodiment, capacitor $C_o$ may be about 100 μF.

Also shown in FIG. 5 is an electronic control unit 46 (hereinafter controller 46) configured to implement a desired control strategy for the operation of the apparatus 10, including each of the AC/DC conversion modules $32_i$. It should be understood that while the controller 46 is shown with inputs/outputs associated with one AC/DC conversion module, that that the controller 46 can be configured to control all the AC/DC conversion modules or alternatively, additional controllers 46 can be provided.

The controller 46 includes an electronic processor 48 and a memory 50. The processor 48 may include processing capabilities as well as an input/output (I/O) interface through which the processor 48 may receive a plurality of input signals and generate a plurality of output signals (e.g., gate drive signals for switches $M_1$~$M_4$, $P_1$~$P_4$, and $S_1$~$S_4$). The memory 50 is provided for storage of data and instructions or code (i.e., software) for processor 48. The memory 50 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although not shown in FIG. 5, the conversion modules 32; may also include driver circuits to interface between the outputs of the controller 46 and the gate terminals of the semiconductor switches. In an embodiment, such gate drive devices may comprise commercially available components, such as a commercially available chip known in the art, for example, a gate drive chip available under part number IXD_614 from IXYS Corporation, Milpitas, Calif., USA.

The memory 50 also stores executable code in the form of main control logic 51, which is configured to control the overall operation of apparatus 10 in accordance with a desired control strategy. The main control logic 51, when executed by the processor 48, is configured to generate, in response to one or more input signals, the various gate drive signals for the switches $M_1 \sim M_4$, $P_1 \sim P_4$, and $S_1 \sim S_4$. The main control logic 51 may include programmed logic blocks to implement specific functions, including without limitation grid rectifier logic 58, power factor correction (PFC) logic 60, zero voltage switching (ZVS) logic 62, and operating mode control logic 64.

The grid rectifier logic 58 is configured to generate the gate drive signals for switches $M_1 \sim M_4$ of rectifier stage 66. To accomplish this, the apparatus 10 may include a respective grid voltage sensor 52 (shown in block form—one for each conversion module) configured to output a respective signal indicative of a grid voltage, including a polarity (i.e., positive or negative). The voltage sensor 52 may be disposed on the grid side (i.e., electrically connected to respective phase of the AC source 12) to monitor the grid voltage. In an embodiment, the sensor 52 may comprise conventional components known in the art.

Figure 6:
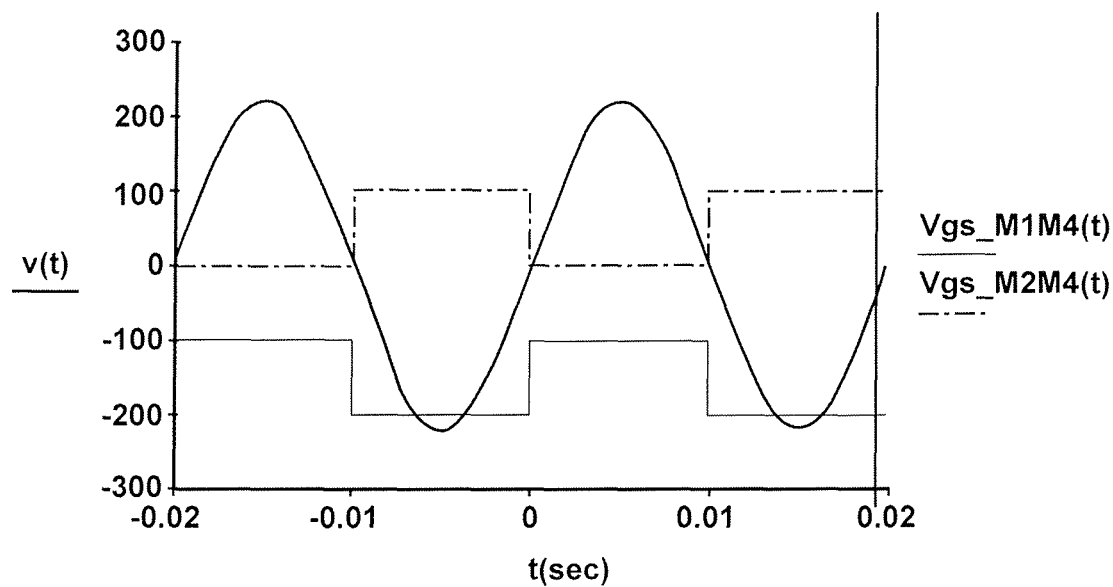
FIG. 6 shows simplified timing diagrams of a first set of switch control signals associated with a full bridge AC/DC rectifier of FIG. 5.

FIG. 6 shows timing diagrams of the gate drive signals (i.e., switch control signals) produced by the grid rectifier logic 58 of the controller 46. The $M_1 \sim M_4$ based rectifier stage 66 will rectify the grid AC voltage into a DC voltage, in the first (charging) mode of operation. In an embodiment, the switching frequency of $M_1 \sim M_4$ is the same as the grid voltage (e.g., 50-60 Hz). Note, that $M_1 \sim M_4$ are controlled by the detecting the polarity of the grid voltage. Thus, when the grid voltage is positive, $M_1$ and $M_4$ are turned on (i.e., the $V_{GS}$ of $M_1$ and $M_4$ is high). When the grid voltage is negative, $M_2$ and $M_3$ are turned on. The gate drive signals for switches $M_1$ and $M_4$ operate in unison while switches $M_2$ and $M_3$ operate in unison. Additionally, the combination of $M_1 M_4$ are complementary to the combination of $M_2 M_3$. In sum, the switches $M_1 \sim M_4$ are all active switches working at the grid frequency, e.g., 60 Hz, as per the zero transitions of the grid voltage sensor 52.

Referring again to FIG. 5, power factor correction (PFC) control logic 60 is configured, in general, in the first (charging) mode of operation, to manage the operation (i.e., conduction or non-conduction) of the switches $P_1 \sim P_4$ and $S_1 \sim S_4$ in such a way so as to control the instantaneous current drawn from the AC source 12 so as to be in phase with the instantaneous voltage of the AC source 12. To achieve a unity or near unity power factor (i.e., a condition where the grid side voltage and current are in phase), the conversion apparatus 10 includes a grid current sensor 54. In an embodiment, the current sensor 54 is configured to determine the current through inductor 34 and provide a signal to the controller 46 that indicates the level of electrical current being drawn from the AC source 12. This signal is thus a grid current indicative signal. In an embodiment, the controller 46 through the execution of the PFC logic 60 implements power factor correction by controlling the above-mentioned gate drive signals. Grid current sensor 54 may comprise conventional components known in the art.

Zero voltage switching (ZVS) logic 62 is configured, in general, to manage the switches $P_1 \sim P_4$ and $S_1 \sim S_4$ in such a way so that they are turned on and off preferably with a zero or a near zero voltage. Generally, in order to maintain zero voltage switching for switch turn-on, before the turning on action, current should reverse flow from the source to drain, which makes the switch voltage drop to zero. Thus, during the switch turn on, the switch only undertakes the current change with a voltage then-prevailing across the drain to source of the switch always being close to zero, which in turn eliminates the turn-on loss to thereby reach the ZVS turn on. For more information, reference may be made to U.S. application Ser. No. 14/744,998, filed 19 Jun. 2015 (hereinafter the '998 application, entitled "GATE DRIVE CIRCUIT"), which '998 application is hereby incorporated by reference as though fully set forth herein.

Figure 7:
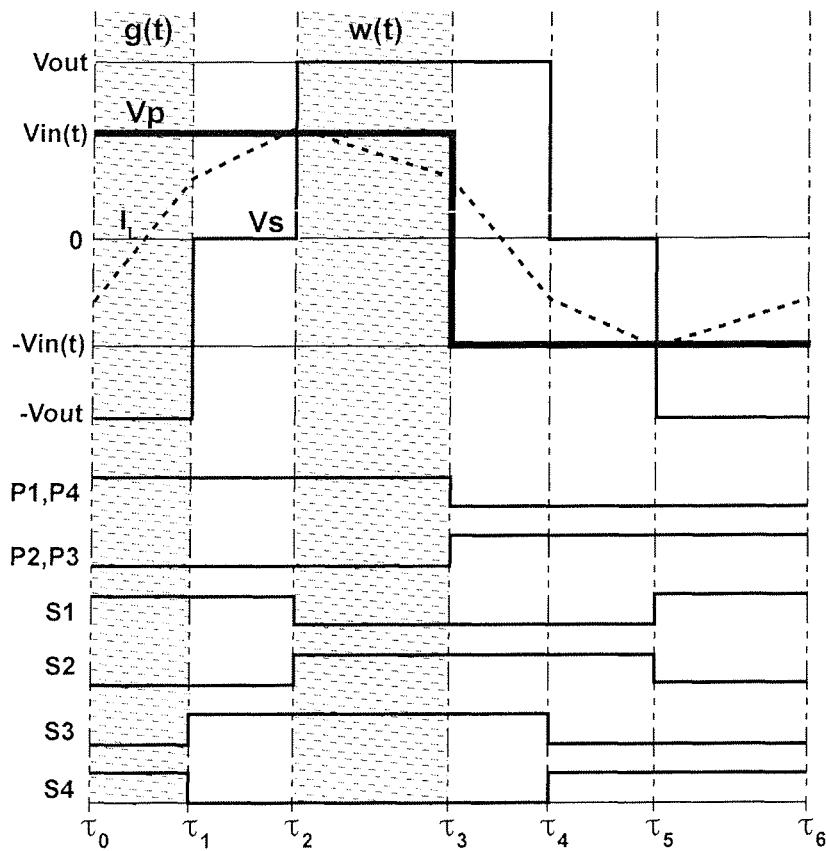
FIG. 7 shows simplified timing diagrams of a second and a third set of switch control signals that control the operation of a dual-active-bridge of FIG. 5.

FIG. 7 shows timing diagrams of the above-mentioned gate drive signals) to control the operation of switches $P_p \sim P_4$ and $S_1 \sim S_4$ in a single switching frequency embodiment, in the first (charging) mode of operation. In the illustrated embodiment, switches $P_1 \sim P_4$ and $S_1 \sim S_4$ will be operated at the same switching frequency $f_s$ with 50% duty cycle. To achieve the high system power density, the switching frequency $f_s$ should be as high as possible. The gate drive signals for $P_1$ and $P_4$ are complementary with $P_2$ and $P_3$. In addition, the gate drive signals $S_1$ and $S_2$ are complementary as are signals $S_3$ and $S_4$. The signal traces $V_P$ and $V_S$ correspond to the output voltages of the dual-active-bridge (DAB) primary side and secondary side while the signal trace $I_L$ corresponds to the current of the primary inductor, which is shown in timed relationship to the states of switches $P_1 \sim P_4$ and $S_1 \sim S_4$.

The main control logic 51 is configured to introduce a phase shift between the gate drive signals for $S_1$ and $S_3$. (i.e., see the time period between $\tau_0$ and $\tau_1$). Plural factors, including the switching frequency $f_s$ and the determined phase shift between $S_1$ and $S_3$, determine the power transferred from the primary side to the secondary side. In other words, the above-mentioned factors provide two degrees of freedom to control the transferred power. Meanwhile, in order to achieve ZVS, the phase shift must fall into a certain range, which restricts the switching frequency $f_s$ to a certain value as well.

Figure 8:
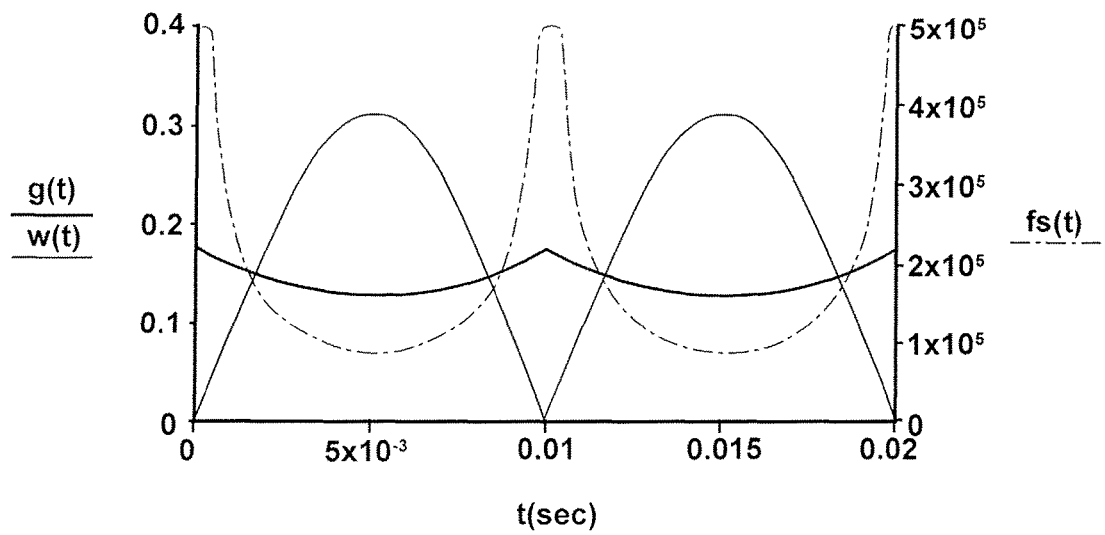
FIG. 8 is a timing diagram of parameters for determining the switch timing of FIG. 7.

The main control logic 51, in compliance with the PFC logic 60 and the ZVS logic 62, determine at least two parameters, designated g(t) and w(t) in FIGS. 7-8. The g(t) parameter corresponds to a time between $\tau_0$ and $\tau_1$—while the w(t) parameter corresponds to a time between $\tau_2$ and $\tau_3$.

FIG. 8 is a timing diagram showing waveforms of the above-described g(t) and w(t) parameters, which are the two parameters used by the controller 46 to determine the phase shift. The parameter fs(t) corresponds to the switching frequency $f_s$.

In an embodiment, the main control logic 51 is executed by the controller 46 wherein the functions of the rectifier logic 58, the PFC logic 60, and the ZVS logic 62 are realized concurrently. In this regard, the w(t) parameter may be determined by the controller 46 in accordance with Equation (1):

$$w(t) = \frac{0.5 * (Vin(t) - 2 * g(t) * Vin(t))}{Vout * n} \qquad \text{Equation (1)}$$

where Vin(t) is measured voltage on the grid side (i.e., input node 36—FIG. 5), $V_{out}$ is the measured output voltage of the converter at output node 80, and n is turn ratio of the transformer 40 (i.e., $N_s/N_p$ where $N_s$ is the number of secondary turns and $N_p$ is the number of primary turns).

$$I_{in}(t) = \frac{(1 - 2w(t)) * Vin(t) + 2n * g(t) * Vout}{2 * L * fs(t)} * (0.5 - g(t)) \quad \text{Equation (2)}$$

Each phase current could be controlled by the g(t), w(t), and fs(t).

The parameter g(t) in Equation (1) may be determined by the system designer to achieve ZVS switching, as known in the art, for example, as seen by reference to U.S. Pat. No. 9,729,066, application Ser. No. 15/198,887 entitled "ELECTRIC POWER CONVERSION APPARATUS HAVING SINGLE-PHASE AND MULTI-PHASE OPERATION MODES" hereby incorporated by reference as though fully set forth herein. In operation, the controller 46 may vary the switching frequency $f_s$ in real time during operation. In other words, the controller 46 executing main control logic 51 (and subordinate logic modules described herein) may vary the operating switching frequency of $P_1$~$P_4$ and $S_1$~$S_4$ during real time operation, and, in addition, it should be understood that the ZVS implementation may restrict switching frequency, also as seen by U.S. Pat. No. 9,729,066.

With continued reference to FIG. 5, the main control logic 51 still further includes operating mode control logic 64 that is stored in memory 50 and which, when executed by the controller 46, is configured to control the switching block 16 to assume (i) the first condition described above for the first (charging) mode of operation, when predetermined battery charging criteria are satisfied, and (ii) the second condition described above for the second (motor driving) mode of operation, when predetermined motor driving criteria are satisfied.

For example only, the predetermined battery charging criteria may include the apparatus 10 determining when the electric vehicle is in a still (motionless) condition and ready for charging (e.g., in "Park"). For example only, the predetermined motor driving criteria may include the apparatus 10 determining when the electric vehicle is in a ready-for-driving condition (e.g., in "Drive"). In this regard, criteria for determining the driving mode may include where (i) the vehicle is placed in the drive mode by either inserting the key in the ignition switch, detecting the presence of the key inside the vehicle cabin, or determining that a cell phone key is correct; (ii) detecting the removal of the AC charging plug from vehicle; and (iii) determining that a battery state of charge is sufficient for driving.

Figure 10:
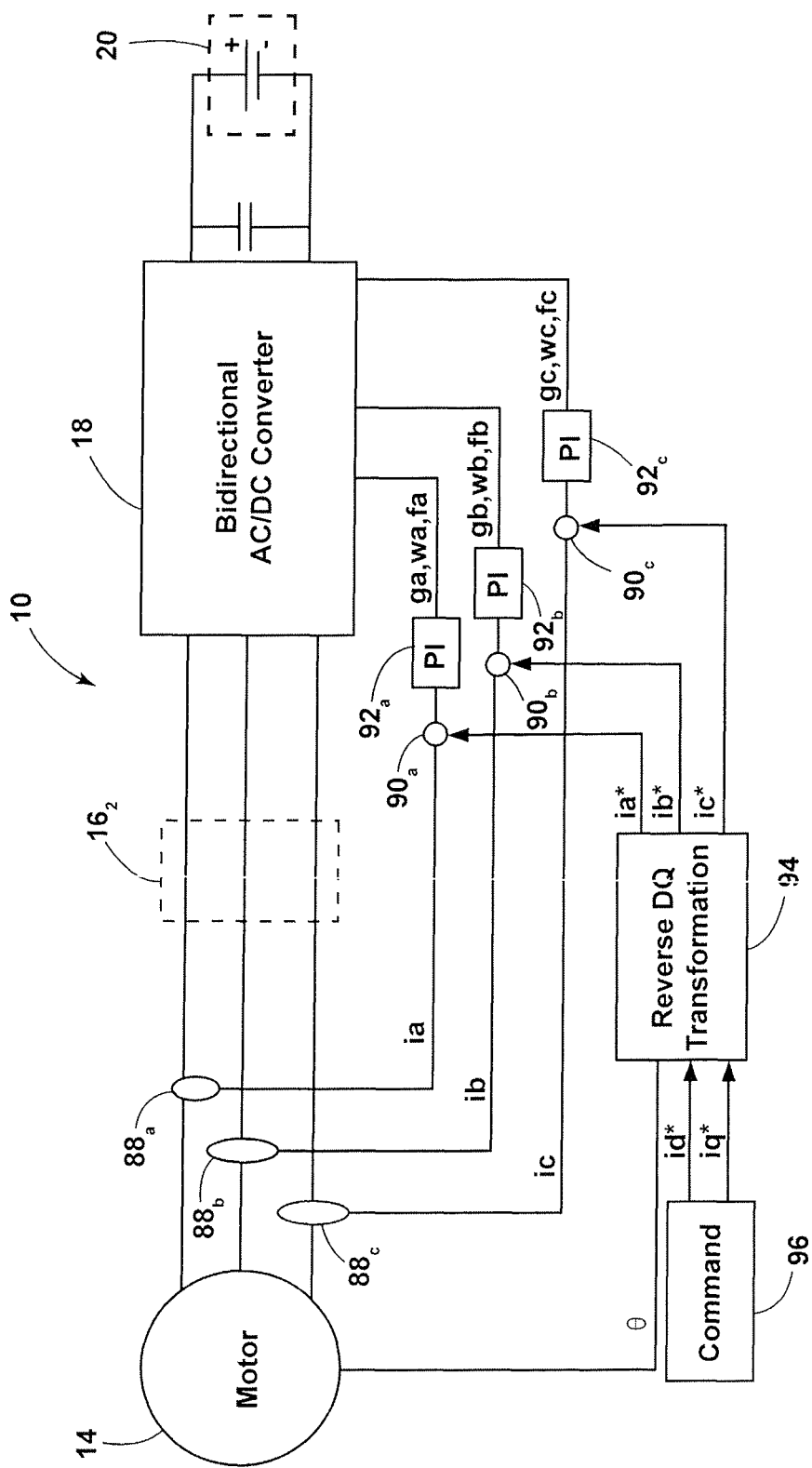
FIG. 10 is a simplified schematic and block diagram of the apparatus of FIG. 1 in a further embodiment in the second mode of operation for electric motor driving.

FIG. 10 is a simplified schematic and block diagram of an embodiment of apparatus 10 suitable for use in the second motor driving mode of operation. When the operating mode control logic 64 determines that the apparatus should be in the second mode of operation, the controller 46 commands the switching block 16, and in particular relay bank $16_2$, to assume the second condition where the bidirectional AC/DC converter 18 is electrically connected to the electric motor 14 via bank $16_2$, as shown in which the electrical connections are electrically closed. In the second mode of operation, the converter 18 is configured to operate, in function, as a current-source inverter (CSI) in an embodiment. As noted above, the charging/driving power is determined by the phase shift and the switching frequency.

In the embodiment of FIG. 10, assume that the electric motor 14 is a Permanent Magnet Synchronous Motor (PMSM) and that the configuration as shown implements a control algorithm for operation in the second motor driving mode of operation. FIG. 10 shows a plurality of current sensors 88a, 88b, and 88c for detecting a respective (actual) phase current ia, ib, and ic for phase a, phase b, and phase c that are being applied to the electric motor 14, where the sensors generate a respective phase current indicative signal, as shown. FIG. 10 further shows a plurality of comparison devices 90a, 90b, and 90c as well a plurality of PI (proportional-integral) control blocks 92a, 92b, and 92c. FIG. 10 further shows a reverse DQ transformation block 94 and well as an input drive command block 96.

The illustrated embodiment implements a so-called dq model for n-phase motor control, where the motor speed is determined by the d-axis current (id*) and the motor torque is determined by the q-axis current (iq*). Command block 96 represents a commanded motor speed and torque as dictated by predetermined vehicle control methods, for example, supplied with the user inputs as well as various vehicle operating parameters, as is conventional in the art. Accordingly, the id* and iq* are the commands corresponding to the desired or sought-after motor operating conditions of the motor 14. The reverse DQ transformation block 94 is configured to translate the sought-after motor speed and torque conditions into corresponding phase currents, designated ia*, ib*, and ic* (i.e., these are the reference currents for phases a, b, and c). The actual (sensed) motor phase currents ia, ib, and ic are compared to the reference phase currents and a respective difference or error signal is produced, which is fed to the corresponding PI control block 92a, 92b, and 92c. The PI control blocks 92a, 92b, and 92c are in turn configured to generate the appropriate converter control parameters for each phase, where g(t) for phase A is ga, w(t) for phase A is wa, and fs(t) for phase A is fsa (e.g., ga, wa, fsa for phase A, gb, wb, fsb for phase B, and gc, wc, and fsc for phase C). These control parameters control the conversion of DC power drawn from battery 20 into respective phase currents to be applied to the electric motor.

Embodiments consistent with the present disclosure have a number of advantages. One advantage is low cost. Using one AC/DC converter to realize both fast charging and motor driving results in a significant cost reduction of the overall power electronics systems on board a vehicle as compared to conventional realizations that include separate AC/DC and DC/AC converters for each purpose.

Another advantage is high power density. The bidirectional AC/DC converter employs, in an embodiment, GaN HEMTs solid state switches in the switching modules, which may be operated at a relatively high switching frequency >100 kHz, which may be nearly ten times as fast as a switching frequency associated with conventional Si switches. Such high switching frequency results in higher-order harmonics that are easier to be filtered. As a result, this situation allows the use of much smaller output capacitors paralleled to the battery, thereby reducing space occupied and increasing power density.

A still further advantage is high efficiency. A conventional DC/AC inverter works at the hard switching mode, which results in high switching losses thereby tending for low switching frequency. In an embodiment, the bidirectional AC/DC converter is configured to work in a soft switching mode resulting in higher efficiency. In contrast, a conventional Si switch-based inverter may have a 10 kHz switching frequency and 96% efficiency, while a GaN HEMT switch-based inverter embodiment has a >100 kHz switching frequency and 98% efficiency, even with an isolation transformer.

A still further advantage involves promoting fast charging. In a conventional charger, its power capability is not only limited by the grid power, but is also limited by the cost involved and the available space. With many of the single-phase chargers having power density of about 1 kW/L and the three-phase chargers having a power density of about 2 kW/L, it is difficult to design any charger >20 kW, which would require significant space (volume) in the vehicle, which is generally not available. By using the same converter for both battery charging and motor driving purposes, the charger and the inverter will have the same power level capabilities, which makes the system particularly suitable for use in the so-called fast battery charging approach, for example, involving power charging levels of about ~50 kW.

It should be understood that an electronic control unit as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic control unit may further be of the type having both ROM, RAM, a combination of non-volatile and volatile (modifiable) memory so that any software may be stored and yet allow storage and processing of dynamically produced data and/or signals.

Although only certain embodiments have been described above with a certain degree of particularity, those skilled in the art could make numerous alterations to the disclosed embodiments without departing from the scope of this disclosure. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. An electric power conversion apparatus, comprising:
    an electronic controller including a processor and a memory;
    a switching block controlled by said controller and having a first interface configured to be connected to a power grid source for receiving a first AC signal having first, second, and third phases, said switching block having a second interface configured to be connected to an electric motor;
    a three-phase bidirectional AC/DC converter configured to be connected to a third interface of said switching block and including first, second, and third single-phase AC/DC conversion modules each connected to and controlled by said controller, said AC/DC conversion modules having respective inputs, respective outputs joined at an output node, and a respective transformer configured to provide electrical isolation;
    wherein in a first mode of operation, said controller controls said switching block to assume a first condition that (i) connects said first and third interfaces so that said power grid is connected to said three-phase AC/DC converter which is controlled to convert said first AC signal to an output signal having a DC component at said output node for charging a battery, and (ii) disconnects said second and third interfaces to thereby disconnect said electric motor;
    wherein in a second mode of operation, said controller controls said switching block to assume a second condition that (i) disconnects said first and third interfaces so as to disconnect said power grid, and (ii) connects said second and third interfaces to connect said electric motor to said three-phase bidirectional AC/DC converter which is controlled to convert DC power drawn from said battery to a second AC signal for energizing said electric motor; and
    wherein each AC/DC conversion module respectively comprises (i) a rectifier stage for converting a respective phase of said first AC signal into a DC signal, and (ii) a dual-active-bridge (DAB) stage configured to convert said DC signal into said output signal having said DC component, wherein each dual-active-bridge (DAB) stage includes:
        (i) a first full bridge coupled to said rectifier stage including a plurality of DC to AC switches,
        (ii) said transformer having a respective primary winding coupled to said first full bridge, said transformer having an electrically isolated and magnetically coupled secondary winding, and
        (iii) a second full bridge between said secondary winding and said output node and including a plurality of AC to DC switches.

2. The apparatus of claim 1 further comprising operating mode control logic stored in said memory which when executed by said controller is configured to control said switching block to assume (i) said first condition when predetermined battery charging criteria are satisfied and (ii) said second condition when predetermined motor driving criteria are satisfied.

3. The apparatus of claim 1 further comprising main control logic stored in said memory which when executed by said controller is configured, when in said first mode of operation, to control operation of said three-phase bidirectional AC/DC converter so as to achieve power factor correction (PFC) and zero voltage switching (ZVS) while charging said battery.

4. The apparatus of claim 1 wherein operation of said first, second, and third AC/DC conversion modules in said first mode of operation produce respective AC components thereof that cancel each other out.

5. The apparatus of claim 1 wherein each rectifier stage is coupled to a respective one of said first, second, and third phases of said first AC signal and is configured to produce a respective DC signal, each rectifier stage including a respective plurality of rectifier switches arranged in a full bridge arrangement.

6. The apparatus of claim 5 wherein said controller includes rectifier logic stored in said memory, said rectifier logic when executed by said controller being configured to generate a first set of switch control signals corresponding to gate drive signals for said plurality of rectifier switches.

7. The apparatus of claim 6 further comprising a grid voltage sensor in sensing relation to said first AC signal from said power grid source configured to generate a grid voltage signal indicative of said first AC signal voltage.

8. The apparatus of claim 7 wherein said rectifier logic, in said first mode of operation, is responsive to said grid voltage signal in generating said first set of switch control signals so as to provide synchronous rectification of said first AC signal.

9. The apparatus of claim 1 further including a coupling inductor in series between said first full bridge and said primary winding of said transformer.

10. The apparatus of claim 1 wherein said first AC signal has a first frequency, said first full bridge is configured, in said first mode of operation, to convert said first DC signal into a third AC signal, said third AC signal having a second frequency that is greater than said first frequency, said main control logic, when executed by said controller in said first mode of operation, being configured to generate (i) a second set of switch control signals corresponding to gate drive signals for said plurality of DC to AC switches and (ii) a third set of switch control signals corresponding to gate drive signals for said AC to DC switches.

11. The apparatus of claim 10 wherein said main control logic includes power factor correction (PFC) logic which, when executed by said controller in said first mode, is configured to generate said second and third sets of switch control signals so as to increase a power factor associated with power drawn from said power grid source towards one.

12. The apparatus of claim 11 wherein said PFC logic is configured to vary a phase difference in gate drive signals associated with respective DAB stages.

13. The apparatus of claim 1 wherein said main control logic includes motor control logic stored in said memory, said motor control logic, when executed by said controller in said second mode of operation, being configured to control operation of said first, second, and third AC/DC conversion modules based on a motor control command signal to produce said second AC signal to drive said electric motor.

14. The apparatus of claim 1 wherein said switching block comprises electrically-actuated relays.

15. The apparatus of claim 1 further comprising main control logic stored in said memory which when executed by said controller is configured, when in said second mode of operation, to control operation of said three-phase bidirectional AC/DC converter so as to achieve zero voltage switching (ZVS) while driving said motor.

* * * * *